United States Patent
Song et al.

(10) Patent No.: US 12,185,736 B1
(45) Date of Patent: Jan. 7, 2025

(54) FOOD COMPOSITIONS HAVING ALLULOSE AND MASTIC GUM FOR ENHANCED HEALTH

(71) Applicant: Pulpdent Corporation, Watertown, MA (US)

(72) Inventors: RuiQi Song, Lexington, MA (US); Kenneth Berk, Newton, MA (US)

(73) Assignee: Pulpdent Corporation, Watertown, MA (US)

( * ) Notice: Subject to any disclaimer, the term of this patent is extended or adjusted under 35 U.S.C. 154(b) by 0 days.

(21) Appl. No.: 18/420,202

(22) Filed: Jan. 23, 2024

(51) Int. Cl.
*A23G 1/48* (2006.01)
*A23G 1/32* (2006.01)
*A23G 1/40* (2006.01)

(52) U.S. Cl.
CPC ............ *A23G 1/40* (2013.01); *A23G 1/325* (2013.01); *A23G 1/48* (2013.01)

(58) Field of Classification Search
CPC ........................................................ A23G 1/48
See application file for complete search history.

(56) References Cited

U.S. PATENT DOCUMENTS

| | | | | |
|---|---|---|---|---|
| 2010/0278981 A1* | 11/2010 | Ervin | ............... | A23G 1/48 426/541 |
| 2018/0271112 A1* | 9/2018 | Barkalow | ............... | A23G 3/42 |
| 2021/0227849 A1* | 7/2021 | Kiayei | ............... | A23G 9/08 |
| 2022/0142196 A1* | 5/2022 | Mongia | ............... | A23G 1/48 |
| 2023/0088659 A1 | 3/2023 | St. John et al. | | |
| 2023/0354845 A1 | 11/2023 | Wan et al. | | |

FOREIGN PATENT DOCUMENTS

WO 2019241146 A1 12/2019
WO 2019241583 A1 12/2019

OTHER PUBLICATIONS

International Search Report and Written Opinion in Application No. PCT/US2024/012569 dated Aug. 21, 2024, 17 pages.
Future Markets Insight Report, "Mastic Gum Market Demand, Analysis & Share by 2033," FMI (Feb. 1, 2021), pp. 1-21, URL: https://www.futuremarketinsights.com/reports/mastic-gum-market [retrieved Jul. 20, 2024], 11 pages.

* cited by examiner

*Primary Examiner* — Jenna A Watts
(74) *Attorney, Agent, or Firm* — Barclay Damon LLP

(57) ABSTRACT

A food composition includes allulose having a concentration of about 60% to about 70% by weight, a cocoa product having a concentration of about 20% to about 30% by weight, and at least one natural plant resin having a concentration of about 0.37% to about 2.19% by weight. The at least one natural plant resin may be mastic gum and/or mastic powder. The food composition may further include a combination of plant-derived biominerals and/or antioxidants as active ingredients. A confectionary product made with the food composition is also disclosed.

19 Claims, 5 Drawing Sheets

*FIG. 2A*
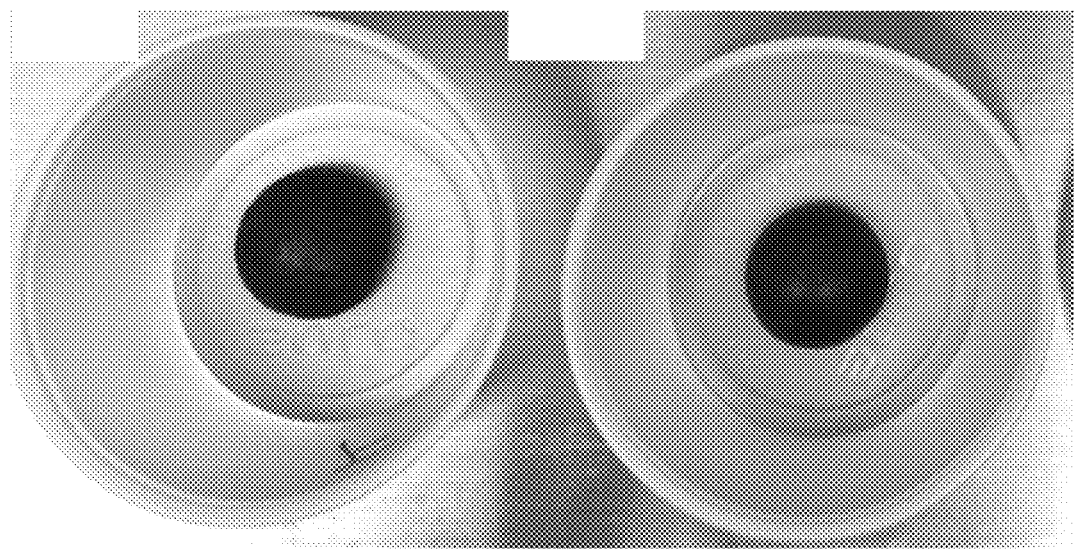
*FIG. 2B*   *FIG. 2C*
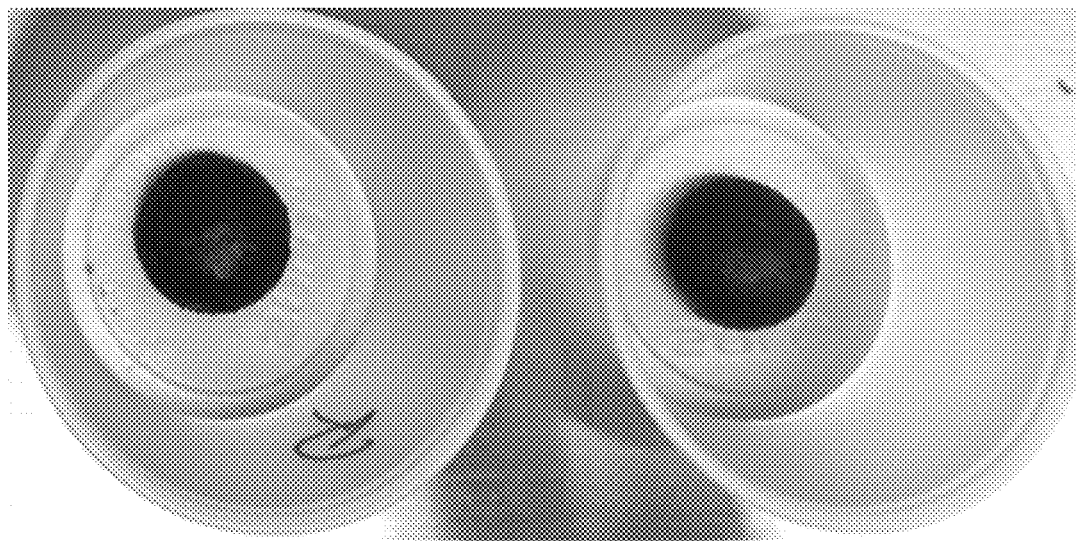
*FIG. 2D*   *FIG. 2E*

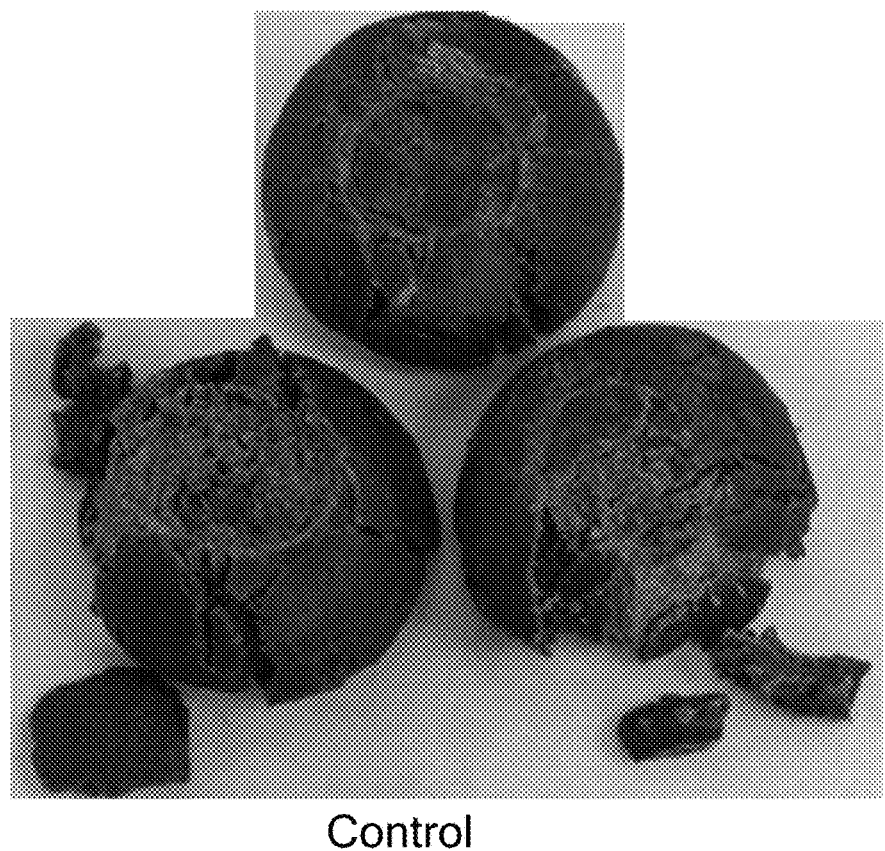
Control
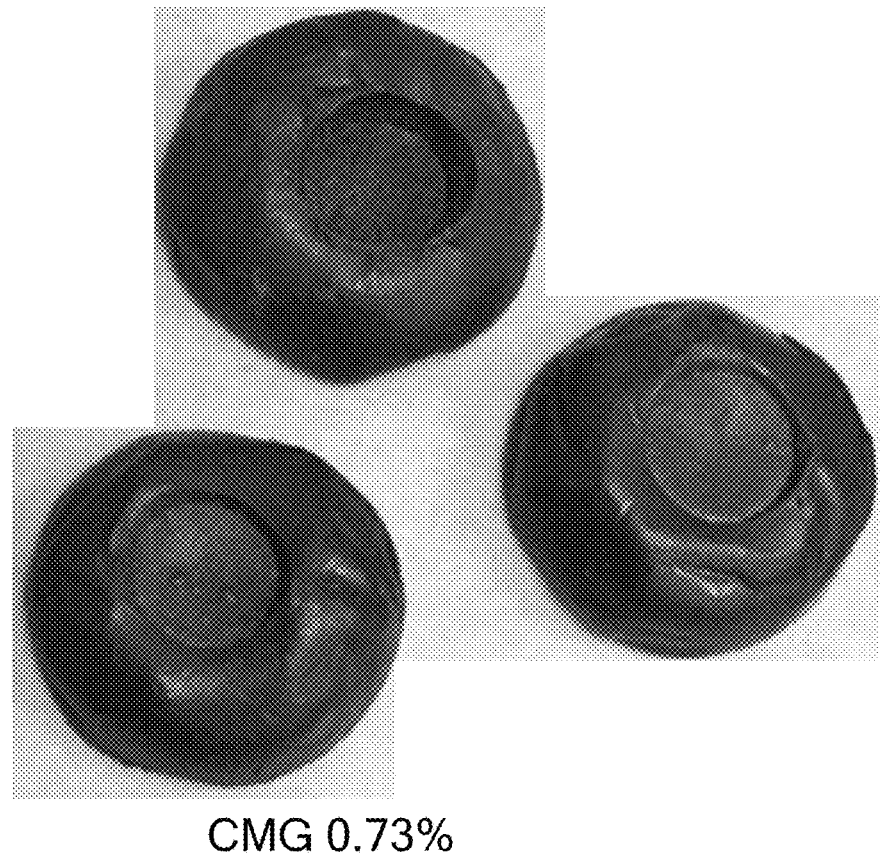
CMG 0.73%

*FIG. 4C*
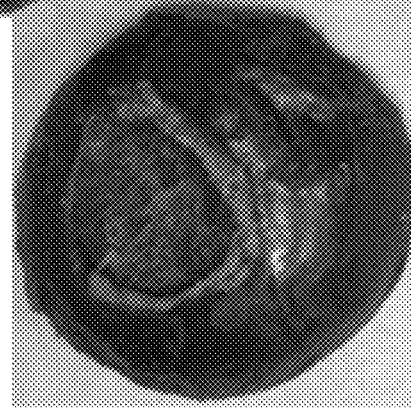
CMG 1.46%
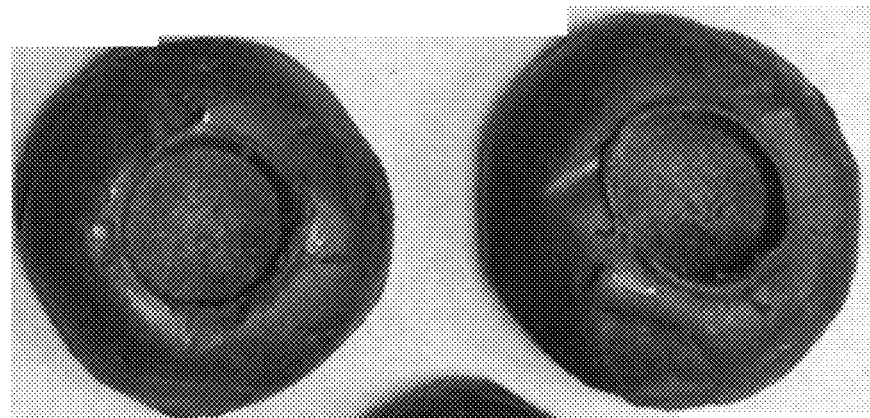
*FIG. 4D*
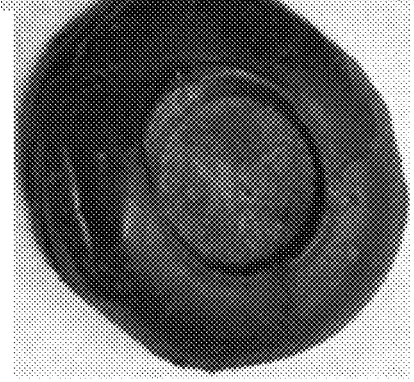
CMG 2.18%

FOOD COMPOSITIONS HAVING ALLULOSE AND MASTIC GUM FOR ENHANCED HEALTH

TECHNICAL FIELD

The present invention relates to food compositions having allulose and mastic gum, and more specifically relates to low calorie and low glycemic food compositions having allulose and mastic gum that may be used for confectionary products that promote enhanced health.

BACKGROUND ART

Allulose is known to be useful as a low calorie and noncarious bulk sugar substitute with various physiological functions, such as anti-inflammatory, anti-oxidation, antihyperglycemic, antihyperlipidemic, anti-obesity, and antiparasitic. See, e.g., FDA issues draft guidance regarding the declaration of allulose on the nutrition Facts label, (2019), https://www.fda.gov/food/cfsan-constituent-updates/fda-issues-draft-guidance-regarding-declaration-allulose-nutrition-facts-label; N. Mijailovic et al., "Rare Sugars: Recent Advances and Their Potential Role in Sustainable Crop Protection," Molecules, 2021, 26(6), 1720; W. Zhang et al., "D-allulose, a versatile rare sugar: recent biotechnological advances and challenges," Critical Reviews in Food Science and Nutrition, 2023, 63:22, 5661-5679; T. Shintani et al., "d-Allulose, a stereoisomer of d-fructose, extends *Caenorhabditis elegans* lifespan through a dietary restriction mechanism: A new candidate dietary restriction mimetic," Biochemical and Biophysical Research Communications, 2017, 493(4), 1528-1533; F. Franchi et al., "Effects of D-allulose on glucose tolerance and insulin response to a standard oral sucrose load: Results of a prospective, randomized, crossover study," BMJ Open Diabetes Research & Care, 2021, 9 (1), e001939; H. Y. Lee et al., "d-Allulose Ameliorates Hyperglycemia Through IRE1α Sulfonation-RIDD-Sirt1 Decay Axis in the Skeletal Muscle," Antioxidants & Redox Signaling, 2022, 37 (4-6), 229-245; F. Au-Yeung et al., "Comparison of postprandial glycemic and insulinemic response of allulose when consumed alone or when added to sucrose: A randomized controlled trial," Journal of Functional Foods, 2023, 105, 105569. However, there are several difficulties with using allulose as a bulk sweetener in making high solids food compositions, such as texture stability, lingering time, taste and flavor.

The difficulty with texture stability is that allulose has a high humectancy and is more hygroscopic than sucrose. See, e.g., W. Mu et al., "Recent Advances on Applications and Biotechnological Production of D-Psicose. Appl. Microbiol. Biotechnol. 2012, 94, 1461-1467; M. Ogawa, et al., "Effects of Rare Sugar D-Allulose on Heat-Induced Gelation of Surimi Prepared from Marine Fish," J. Sci. Food Agric. 2017, 97, 5014-5020; Y. Xia et al., "Research Advances of d-allulose: An Overview of Physiological Functions, Enzymatic Biotransformation Technologies, and Production Processes," Foods, 2021, 10(9), 2186; M. Bolger et al., "Effect of d-allulose, in comparison to sucrose and d-fructose, on the physical properties of cupcakes," LWT, 2021, 150, 111989; O. Tas et al., "Investigation of the Hydration Behavior of Different Sugars by Time Domain-NMR," Foods, 2022, 11(8), 1148. When using allulose as the main and only sweetener for food compositions where the demand for water-free compositions is high, this property of allulose deteriorates the shelf life and needs to be suppressed. When moisture condensates on to the surface, the sweetener matrix can absorb water and dissolve. This causes the formation of a softened and loose layer on the food compositions with a lower level of chewiness on the surface. This requirement for water-free compositions becomes more important when cocoa butter, cocoa paste and cocoa powder are contained in the compositions for the health and nutritional values of the cocoa polyphenols. The adsorption and permeation of moisture can cause a migration of cocoa fat through the matrix of the food compositions and result in the occurrence of blooming observed on the food composition surface.

The difficulty with lingering time length is that allulose is extremely soluble, with a solubility of 291 g in 100 mL of water at 20° C., higher than that of sucrose, which has a solubility of 200 g/100 mL of water. See, e.g., Xia et al., "Research Advances of d-allulose: An Overview of Physiological Functions, Enzymatic Biotransformation Technologies, and Production Processes," Foods, 2021, 10(9), 2186. This makes food compositions sweetened with allulose dissolve quickly in the mouth, and thus have a shorter lingering time, and also reduces the working time for the active ingredients to rejuvenate the oral environment and consequently weakens the oral hygiene effects. One skilled in the art understands that lingering is (a) recording the time when the material is put in the mouth, (b) lightly chewing the material, and (c) recording the time when the material is no longer present in the mouth. The lingering time is determined by (c) minus (a).

The difficulty with taste and flavor is that allulose has a taste similar to that of sucrose, but with a sweetness of only 70% of sucrose. Allulose has a slow start and a heavy taste when it is used at a high content. See, e.g., U.S. Pat. No. 10,869,494; U.S. Pat. Appl. Publ. No. 2021/0244057; and V. Tan et al., "Temporal sweetness and side tastes profiles of 16 sweeteners using temporal check-all-that-apply (TCATA)," Food Research International, 2019, 121, 39-47. To create a favorite sweetness, many investigations have been made by adding other sweetening agents to allulose. For example, a combined use of allulose with erythritol and stevia was disclosed to improve the tasting profile of allulose. See, e.g., U.S. Pat. No. 10,869,494. However, there is increasing research associating intake of sugar alcohols with increased risks for cardiovascular events. For example, erythritol was found to enhance platelet reactivity in vitro and thrombosis formation in vivo. See, e.g., Witkowski et al., "The artificial sweetener erythritol and cardiovascular event risk," Nat. Med. 2023, 29(3):710-718. Therefore, there is a need to make anhydrous allulose-sweetened food compositions that resist texture variations, have an acceptable lingering time, and provide a balanced taste and flavor without the use of sugar alcohols.

SUMMARY OF EMBODIMENTS

In one embodiment of the invention, a food composition includes allulose having a concentration of about 60% to about 70% by weight, a cocoa product having a concentration of about 20% to about 30% by weight, and at least one natural plant resin having a concentration of about 0.37% to about 2.19% by weight.

In related embodiments, the at least one natural plant resin may be mastic gum or powder. Other texturing materials, such as acacia gum or powder, guar gum or powder, locust bean gum or powder, and/or mushroom chitosan, may be further used. A ratio of the mastic gum to the allulose may range from about 1:188 to about 1:31, preferably the ratio of the mastic gum to the allulose may be about 1:95. A ratio of the mastic gum to the cocoa product may range from about 1:74 to about 1:12, preferably the ratio of the mastic gum to the cocoa product may be about 1:37. The cocoa product may include cocoa butter, cocoa paste and/or cocoa powder. The food compositions may further include one or more natural ingredients including polyphenol having a concentration of about 1.0% to about 2.0% by weight. The one or more natural ingredients may include grape seed extract, cranberry extract, elderberry extract, green tea extract, green tea powder, fennel seed extract, fennel seed powder, cardamom seed extract, cardamom seed powder, cinnamon extract, cinnamon powder, desugared beetroot powder, ginger extract, pumpkin seed powder and/or sesame seed powder. The food composition may further include one or more biominerals having a concentration of about 0.1% to about 0.2% by weight. A ratio of the one or more biominerals to the mastic gum may range from about 1:22 to about 1:2, preferably the ratio of the one or more biominerals to the mastic gum may be about 5:24. The one or more biominerals may include calcium and/or magnesium. The food composition may further include sunflower lecithin having a concentration of about 1% by weight.

In accordance with another embodiment of the invention, a confectionary product is made with any of the food compositions mentioned above.

In accordance with another embodiment of the invention, a method of making a healthy food composition includes melting a crystalline allulose to form a melted allulose, cooling the melted allulose to about 45° C. to about 70° C., adding at least one natural plant resin to the cooled melted allulose to form a mixture, and blending a melt of one or more cocoa products with the mixture to form any of the food compositions mentioned above.

In related embodiments, the method may further include adding one or more natural ingredients having polyphenol to the mixture. The method may further include adding one or more biominerals and/or sunflower lecithin to the melt of one or more cocoa products before blending with the mixture.

BRIEF DESCRIPTION OF THE DRAWINGS

The foregoing features of the invention will be more readily understood by reference to the following detailed description, taken with reference to the accompanying drawings, in which:

FIGS. 2A-2E are photographs of food compositions made according to embodiments of the present invention after moisture uptake testing;

FIGS. 4A-4D are photographs of food compositions. The food compositions were made according to embodiments of the present invention. The food compositions were wrapped and stored at room temperature for two months. They were then tested for firmness and photographed.

DESCRIPTION OF ILLUSTRATIVE EMBODIMENTS

Figure 1:
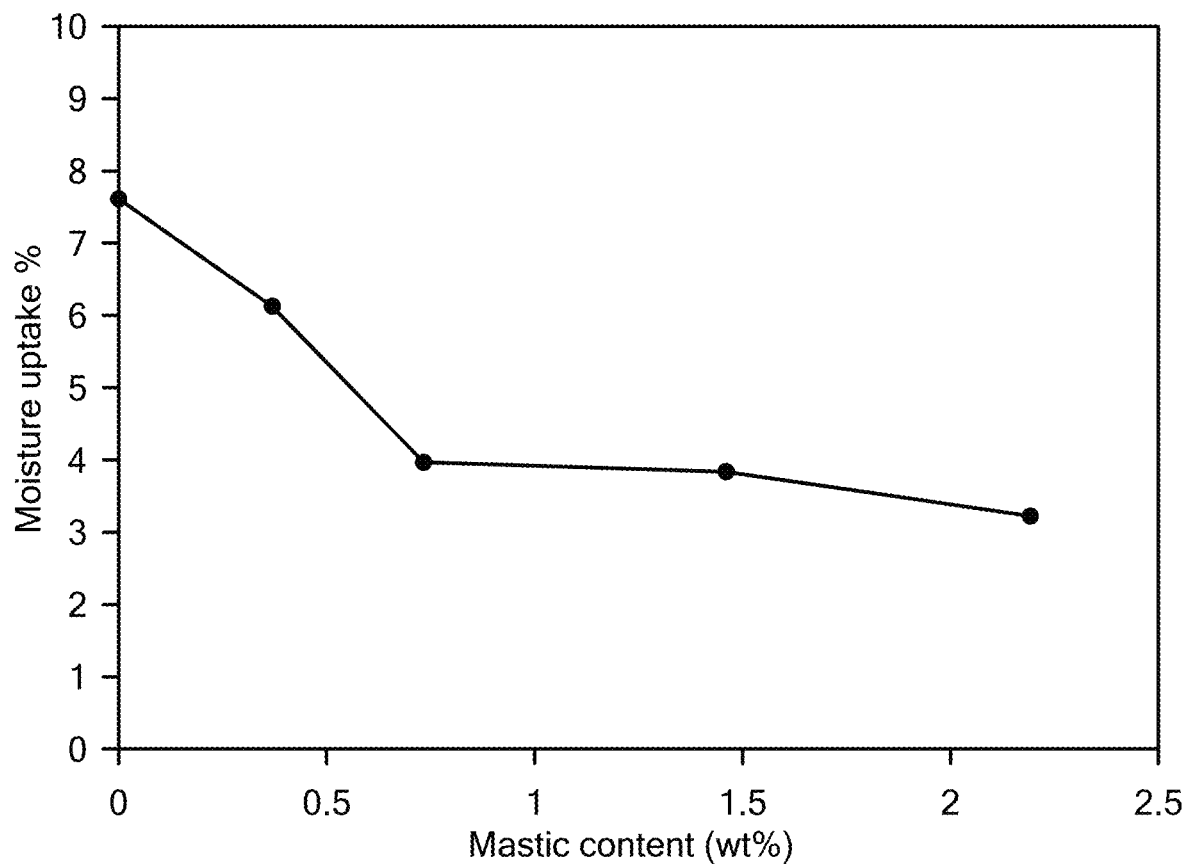
FIG. 1 is a graph of moisture uptake versus mastic content for food compositions made according to embodiments of the present invention.

Embodiments of the present invention provide food compositions and methods of making same, which contain allulose as the main or only sweetener and have an improved storage stability with an acceptable chewiness, lingering time length, taste, and flavor. Embodiments of the present invention also provide food compositions that combine allulose with natural ingredients to make food compositions having multiple functions in health care. The food compositions may be used to make a confectionary product, such as chocolate candy. The food compositions may include chocolate confections, chewy confections, soft candy, hard candy, a combination of hard candy and chocolate, such as a snack bar or lollipops with a soft and chewy filling and/or covered with a hard and chocolate coating, and/or chocolate covered nuts, berries, and vegetables as healthy snacks. The food compositions sweetened with allulose have a natural taste rich in chocolate and may be further modified with a blend of natural ingredients, which have properties as tasting modifiers, to create an acceptable overall sensory profile.

The food compositions are low calorie, low glycemic, and anhydrous compositions that may include mastic gum (also known as *Pistacia lentiscus*) or mastic powder to impart an improved storage stability and chewy texture, an adjustable lingering time, and an acceptable taste and flavor. The combination of allulose and mastic gum with plant derived ingredients containing biominerals and polyphenols allows the food compositions to provide additional health care benefits.

The food compositions according to embodiments of the present invention include allulose as the main or only bulk sweetener, a cocoa product, such as cocoa butter, cocoa paste and/or cocoa powder, and at least one natural plant resin as an active ingredient. Specifically, the food compositions include allulose having a concentration of about 60% to about 70% by weight, a cocoa product having a concentration of about 20% to about 30% by weight, and at least one natural plant resin having a concentration of about 0.37% to about 2.19% by weight of the overall composition.

The natural plant resin(s) used may be any resinous substance secreted from the bark of trees and the stems of other plants, which are low calorie, non-cariogenic, low glycemic, and have documented applications as food, beverage and medicinal additives, such as mastic gum or powder, frankincense gum and powder, benzoin gum or powder, elemi gum or powder, sweetgum and powder, and Aleppo pine gum and powder. Other materials that may be used include acacia gum or powder, guar gum or powder, locust bean gum or powder, and/or mushroom chitosan.

The low calorie and low glycemic oral care food compositions provide chewiness similar to taffy but without water. The natural plant resins function as texturing agents, which alleviate the issues typically observed when using allulose. The texturing agents help compensate for the loss of texture and mouthfeel when sugar is fully replaced with allulose. The texturing agent is preferably dispersed well in allulose and melts without degradation. The natural plant resin(s) help to stabilize the overall texture of the food compositions, to improve sensory properties, to facilitate the oral care properties of the food compositions, and to act effectively in allowing the food compositions to resist structural changes, which may be caused by the hygroscopic property of allulose and lead to quality deterioration.

The natural plant resin used may be mastic gum and may have a ratio of mastic gum to allulose ranging from about 1:188 to about 1:31, and preferably be about 1:95. A ratio of the mastic gum to the cocoa product or solids may range from about 1:74 to about 1:12, and more preferably be about 1:37. The presence of mastic gum significantly increases the linger time of the food composition and enhances its firmness. Surprisingly, anhydrous food compositions with a high content of allulose show a much lower tendency for texture softening on the surface when adding a particularly low amount of mastic gum. The storage stability of the food compositions is thereby considerably improved. An increased chewiness and prolonged lingering time are obtained by using mastic gum as the texturing agent or texture modifier. This is a new way of using mastic gum, different from the methods known in making conventional confections, which use gelatins to expand the shelf life of toffees and use water to dissolve the gelatin to allow the confection to have various functionalities, such as maintaining the texture and providing chewiness. The combination and use of allulose with mastic gum and other natural ingredients results in food compositions with an overall acceptable taste and flavor. In addition, the combination and use of allulose and mastic gum play an important role for incorporating and accommodating other natural ingredients, with different functions, and thus optimizing the potential of the food compositions for health care.

The food compositions according to embodiments of the present invention may further include one or more natural ingredients, including botanical and herbal ingredients and extracts, as a source of different types of phytochemicals and essential antioxidants comprising polyphenols, in particular a combination of A type and B types proanthocyanidins. Specifically, the one or more natural ingredients have a concentration of about 1.0% to about 2.0% by weight of the overall composition. The one or more natural ingredients may include grape seed extract, cranberry extract, elderberry extract, green tea extract, green tea powder, fennel seed extract, fennel seed powder, cardamom seed extract, cardamom seed powder, cinnamon extract, cinnamon powder, desugared beetroot powder, ginger extract, pumpkin seed powder and/or sesame seed powder. The food composition may further include sunflower lecithin having a concentration of about 1% by weight of the overall composition.

The food compositions according to embodiments of the present invention may further include natural biominerals, such as calcium carbonate from Lithothamnium calcareum, which is also known as Phymatolithon calcareum. Lithothamnium calcareum is a reddish colored seaweed, belonging to the corallinaceae family, which crystallizes calcium carbonate in its cell walls, and consequently, is rich in calcium, magnesium, and trace elements including phosphorus. Specifically, the one or more natural biominerals have a concentration of about 0.1% to about 0.2% by weight of the overall composition. A ratio of the one or more biominerals to the mastic gum may range from about 1:22 to about 1:2, and preferably be about 5:24.

Embodiments of the present invention provide several benefits over the prior art allulose sweetened compositions, such as disclosed in KR 20170132151 or U.S. Pat. Appl. Publ. Nos. 20180279643, US 20180271112. The food compositions according to embodiments of the present invention include mastic gum, which acts as a texturing, stabilizing, and emulsifying agent, and also adds nutritional benefits and health values. In addition, the food compositions are anhydrous. Compositions containing water require the presence of a preservative that is essential to help prevent microbes from growing. Anhydrous compositions are more advantageous since they do not require preservatives and are less prone to microbial contamination. Food compositions made according to embodiments of the present invention combine allulose with natural ingredients having mastic gum, and may further include biominerals and high polyphenols ingredients, which function as pH neutralizing agents, antiplaque agents, anticaries agents, anti-gingivitis agents, saliva flow promoters, breath freshening agents, and agents for reducing dental hypersensitivity.

Food compositions made according to embodiments of the present invention provide health care benefits by fully replacing the sugar with allulose, which is noncarious. Confectionary products may be made from the food compositions with chewiness similar to taffy but lasting longer in the mouth. In addition, the confectionary products made from the food compositions according to embodiments of the present invention provide benefits over conventional confectionery compositions having cocoa solids with a chewy texture, such as chewy toffees, because the prior art confectionery compositions feed on carious inducing oral pathogens to produce acids for the demineralization of enamel and have limited shelf life due to the crystallization of the sugar.

A process of making healthy food compositions according to embodiments of the present invention begins with melting crystalline allulose, preferably at a temperature range of about 90° C. to about 96° C., to form a melted allulose, and then cooling the mixture to about 45° C. to about 70° C. Once the melted allulose is cooled, the process further includes adding one or more natural plant gum resin materials, such as mastic gum and/or mastic powder, to the cooled melted allulose to form a mixture. The mixture of allulose and the one or more plant resin materials is then combined and blended with one or more cocoa products that are melted, preferably around 50° C., to form a food composition according to embodiments of the present invention. The plant resins have good compatibility with the melted allulose and the melt of the one or more cocoa products. The one or more cocoa products can quickly soften and remain homogeneously dispersed in the mixture of melted allulose and the one or more natural plant gum resin materials when mixed together. Structural changes of the matrix of allulose that occur during further cooling allows the resin polymer network to form in-situ and be defined in the matrix, which helps maintain the stable texture of the food compositions by preventing the allulose in the matrix from re-crystallizing and resisting blooming.

After the one or more cocoa products are melted, biominerals and/or sunflower lecithin may be added to the cocoa products and mixed together. The cocoa mixture containing biominerals and/or sunflower lecithin may be combined with the mixture of allulose and the one or more plant resin materials, and mixed together at a temperature range of about 45° C. to about 50° C. The as-obtained compound, which is sweetened and elastic, is removed from heat and cooled down to a temperature range of about 25° C. to about 30° C. The method may further include adding one or more natural ingredients having polyphenol to the mixture. The natural ingredients with polyphenols are blended in through kneading and stretching or pulling.

EXAMPLES

The properties of food compositions made according to embodiments of the present invention were tested. Table 1 below shows the components of the food compositions in Examples 1-5 made according to embodiments of the present invention and the properties after testing.

TABLE 1

| Component Mass % | Examples | | | | |
| --- | --- | --- | --- | --- | --- |
| | 1 | 2 | 3 | 4 | 5 |
| Allulose | 69.76 | 69.76 | 69.76 | 69.24 | 68.31 |
| Acacia Gum | 0.73 | — | — | — | — |
| Mastic gum | — | 0.37 | 0.73 | 1.46 | 2.19 |
| Cocoa Paste | 21.52 | 21.52 | 21.52 | 21.56 | 21.53 |
| Cocoa Powder | 5.53 | 5.89 | 5.53 | 5.54 | 5.54 |
| Calcium From Algae | 0.15 | 0.15 | 0.15 | 0.15 | 0.15 |
| Desugared Beetroot Powder | 0.66 | 0.66 | 0.66 | 0.66 | 0.66 |
| Grape Seed Extract | 0.16 | 0.16 | 0.16 | 0.15 | 0.15 |
| Elderberry Extract | 0.09 | 0.09 | 0.09 | 0.09 | 0.09 |
| Cranberry Extract | 0.06 | 0.06 | 0.06 | 0.15 | 0.06 |
| Fennel Seed Powder | 0.13 | 0.13 | 0.13 | — | 0.13 |
| Ginger Root Extract | 0.14 | 0.14 | 0.14 | — | 0.14 |
| Cardamom Seed Powder | 0.03 | 0.03 | 0.03 | — | 0.03 |
| Cinamon Bark Powder | 0.04 | 0.04 | 0.04 | — | 0.04 |
| Sunflower Lecithin | 1.00 | 1.00 | 1.00 | 1.00 | 1.00 |
| Sensory testing | Acceptable | Acceptable | Acceptable | Stronger woody taste | Stronger woody taste |
| Lingering (seconds) | 180 ± 4 | 412 ± 5 | 460 ± 8 | 612 ± 8 | 790 ± 8 |
| Firmness (N/cm2) | 147.72 ± 3.71 | 192.07 ± 3.32 | 195.68 ± 4.32 | 221.92 ± 3.73 | 243.10 ± 6.11 |
| Texture changes caused by firmness testing | Disintegrated | No disintegration | | | |
| Water adsorption activity | High | Low | | | |
| Stability under high humidity | Low; Fat blooming | High; No fat blooming | | | |

The food composition in Example 1 includes 0.73% acacia gum and no mastic gum. The food compositions in Examples 2 to 5 are made according to embodiments of the present invention that resist textural changes, have improved chewiness, and give longer lingering in the mouth. These food compositions include about 60% to about 70% allulose as sweetener and about 0.37% to about 2.19% mastic gum as an active ingredient. The amount of mastic gum added in these compositions was adjusted to investigate the effects of mastic gum on the properties of the food compositions. As shown in Table 1, the presence of mastic gum significantly increases the linger time from about 180±4 seconds for Example 1 to about 412±5 seconds for Example 2 and to about 790±8 seconds for Example 5 and enhances the firmness from about 147.72±3.71 N/cm² for Example 1 to about 192.07±3.32 N/cm² for Example 2 and to about 243.10±6.11 N/cm² for Example 5.

The moisture adsorption activity was investigated by measuring the difference in weight before and after the storage experiment. Plastic containers, cups and vials were incubator dried at 40° C. for at least 1 hour and cooled down in a closed contained for at least 3 hours before the storage experiment. Samples of 5.0 grams±0.1 grams were weighed and set upside down with the flat surface facing upward in the central area of a 3.25 oz cup. Each composition was tested with three samples. Each sample was placed in a closed container (32 oz). Before closing the containers, an uncapped 50 mL vial with a 20.0000 g±0.0005 g of deionized water and a portable hygrometer and thermometer were put into each cup. The cups were put into an incubator with temperature set at 25.0° C.±0.2° C. Filling the vial with 20.0000 g of distilled water kept the relative moisture in each closed cup stay at 85±2% at 25° C. After the 24-hour storage experiment, the cups with samples were weighed and photographed. The moisture adsorption is expressed as a percentage of weight gain.

FIG. 1 is a graph of the moisture uptake obtained after 24 hours at 25° C. and relative humidity of 85+/−2% for Examples 1-5. FIGS. 2A-2E are photographs of food compositions made according to Examples 1-5, respectively, after the moisture uptake testing. After 24 hours, there was a noticeable distinction among the compositions in the five Examples. Food compositions with mastic gum showed an unexpected reduction in moisture adsorption. As shown in FIG. 1, the food composition in Example 1, which contained acacia gum and no mastic gum, had a weight increase of 7.60±0.24% via moisture sorption. The moisture uptake decreased rapidly from Example 1 with no mastic content with an increase in the mastic content in Examples 2 and 3 and then slowly decreased further as the mastic content increased. The composition of Example 3 had only half of the moisture uptake of the composition of Example 1. The composition of Example 5 had the lowest moisture gain. As shown in FIG. 2A, Example 1, which was made without mastic gum, exhibited significant flow with almost half of the bottom of the cup covered after 24 hours. In contrast, as shown in FIGS. 2B-2E, food compositions made according to Examples 2-5 containing mastic gum resisted moisture sorption and did not exhibit flow under the same testing conditions as Example 1.

Figure 3A:
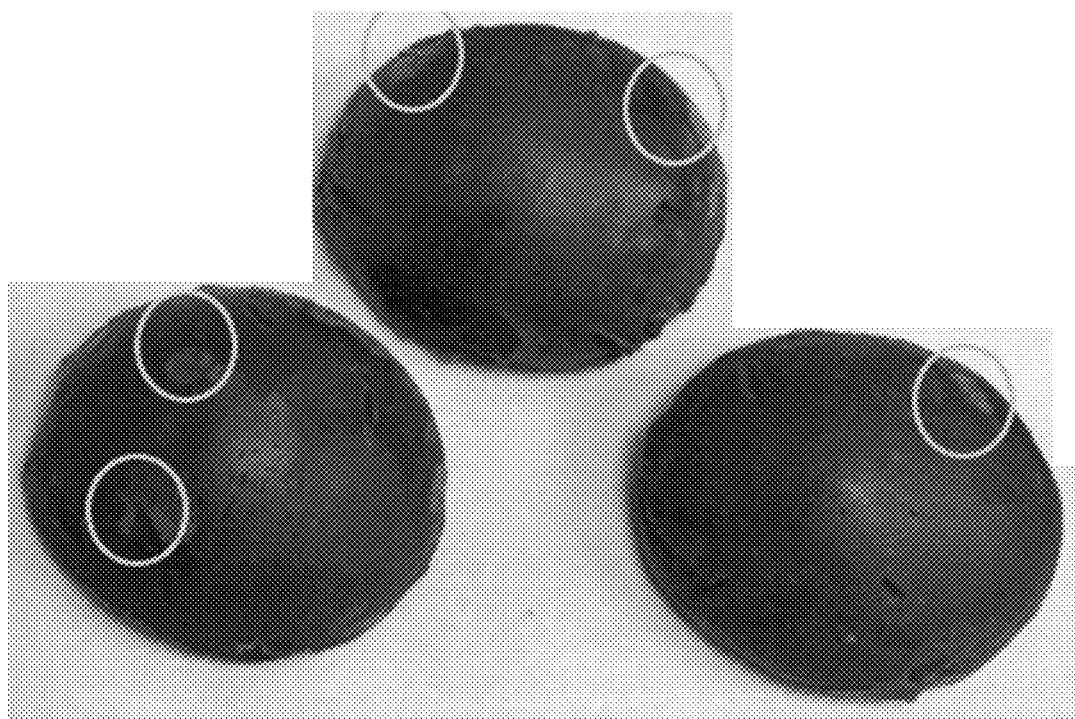
FIGS. 3A-3B are photographs of food compositions made according to embodiments of the present invention after storage at room temperature for over two months.
Figure 3B:
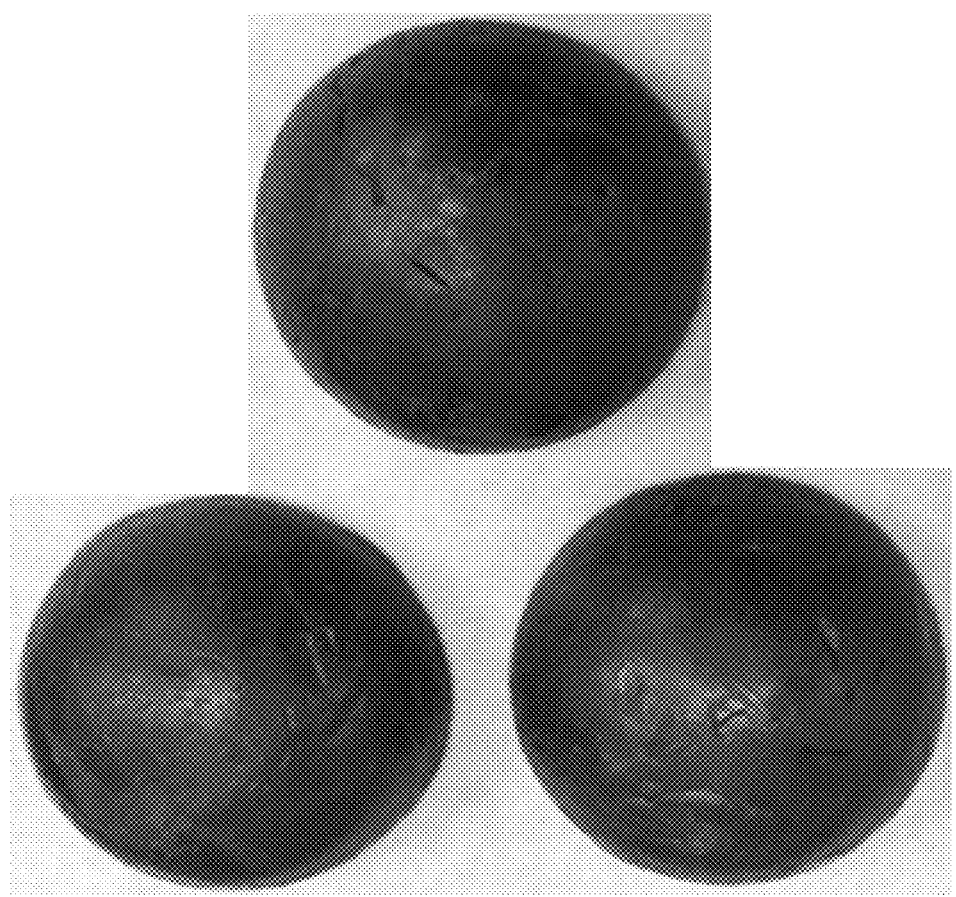

Storage stability of the food compositions was also tested by tracking changes in texture, color, and sensory profile at different time points. The food composition in Example 1 was chewy and had a good consistency in texture when freshly made, but over time (1 month or less when made and packaged with a humidity level of 40% or above; 1 year or more when made and packaged with a humidity level of 25% or less) became soft on the surface and lost the original chewiness, though the central part was still chewy. This indicates the food composition in Example 1 was prone to phase separation. In some cases, where 0.3% water was present, phase separation was even more significant. Food compositions in Examples 2-5 remained more consistent in texture, color, and sensory perception, and resisted the formation of a soft layer on the surface over time as compared to the food composition in Example 1. FIGS. 3A-3B show samples of the food compositions made according to embodiments of the present invention. FIG. 3A shows samples of food compositions made according to Example 1 and FIG. 3B shows samples of food compositions made according to Example 3. Both sets of samples were made, packaged with a humidity of 40%, and stored at room temperature for over two months. As shown in FIG. 3A, fat bloom occurred for the food composition in Example 1. The areas marked with yellow circles in FIG. 3A show that fat migrated through the matrix to the surface of the food composition. Fat bloom was not observed for the food compositions in Examples 2-5. For example, the samples in FIG. 3B, which were made according to the food composition in Example 3, were free from blooming and did not show any fat that migrated to the surface of the composition. This demonstrated that the incorporation of mastic gum helped resist textural changes and fat blooming.

In addition, textural changes were observed for the food compositions made according to Examples 1-5. FIGS. 4A-4D show a comparison of samples stored at room temperature for two months after mixing was done and after firmness testing was performed. FIG. 4A shows the food composition made according to Example 1, FIG. 4B shows the food composition made according to Example 3, FIG. 4C shows the food composition made according to Example 4, and FIG. 4D shows the food composition made according to Example 5. Textural disintegration did not occur for the food compositions in Examples 3 to 5, where mastic resin was present, but there was major textural disintegration for the food composition made according to Example 1, where no mastic resin was present, as shown in FIGS. 4A-4D.

To test sensory evaluation, lingering time, texture changes, and water adsorption, samples of the food compositions were made according to Examples 1-5. The vertical cross section of each sample was semi-elliptical in shape with a cross section of about 2.45 cm and a height of about 1.00 cm. Each sample had a flat surface on the bottom.

The sensory testing indicated that the food compositions in Examples 2-5 had a long-lasting flavor, compared to the food composition in Example 1. However, the taste of the food compositions with mastic gum in an amount higher than 1.0% was undesirable due to a strong woody taste.

The food compositions in Examples 2-5 were much chewier than the food composition in Example 1, but they did not stick to the teeth. Lingering time testing was done by orally tasting the food compositions in Examples 1-5. The lingering time of the compositions was measured by (A) recording the time when 5.0±0.1 g of the material was put in the mouth, (B) lightly chewing the material, and (C) recording the time when the material was no longer present in the mouth. (C) minus (A) is the lingering time. Examples 2-5 demonstrated the beneficial effects on lingering time when substituting mastic gum for acacia gum. The lingering time of the food compositions with mastic gum in Example 2-5 was significantly improved over the lingering time of the food compositions without mastic gum in Example 1 (e.g., 180 seconds±4 seconds). For example, the lingering time increases from about 412 seconds±5 seconds for Example 2 to about 460 seconds±8 seconds for Example 3, about 612 seconds±8 seconds for Example 4, and about 790 seconds±8 seconds for Example 5 while the ratio of mastic gum to allulose increased from about 1:188 for Example 2 to about 1:32 for Example 5. Since the change in lingering time rose with increasing amounts of mastic gum added, the lingering time might therefore be directly related to the presence of mastic gum and the interaction between the mastic gum and the other ingredients existing in the food compositions. Hence, the modification of allulose-sweetened compositions with mastic gum added at a higher ratio of mastic gum to allulose may yield a property characterized with a further increased lingering time, close or similar to that of chewing gum.

The firmness of the food compositions was measured using a VTSYIQI Penecometer with a load of 500 N and a pressure head with a diameter of 1.11 cm. Mastic gum appeared to have a reinforcing effect on the food compositions sweetened with allulose, since the food compositions with mastic gum yielded higher firmness. Examples 2-5 illustrate the effect of substituting the acacia gum with the mastic gum. A correlation was found between increased firmness of the food compositions and an increased ratio of mastic gum to allulose. The food composition in Example 1 having 0.73% acacia gum and no mastic gum only had a firmness of 147.72±3.71 N/cm$^2$. In Examples 2 to 5, an increase of the ratio of mastic gum to allulose from about 1:188 to 1:32 resulted in a significant increase in the firmness of the food compositions. For example, the composition in Example 3 had a firmness of about 195.68±4.32 N/cm$^2$ in the presence of 0.73% mastic gum. In an additional example, 2.19% mastic gum resulted in an increase in the firmness of the food compositions to about 243.10±6.11 N/cm$^2$. These results are consistent with the testing results of lingering time.

Although the above discussion discloses various exemplary embodiments of the invention, it should be apparent that those skilled in the art may make various modifications that will achieve some of the advantages of the invention without departing from the true scope of the invention.

What is claimed is:

1. A food composition comprising:
   allulose having a concentration of about 60% to about 70% by weight;
   a cocoa product having a concentration of about 20% to about 30% by weight; and
   at least one natural plant resin, wherein the at least one natural plant resin includes mastic gum or powder having a concentration of about 0.37% to about 2.19% by weight.

2. The food composition of claim 1, wherein a ratio of the mastic gum to the allulose ranges from about 1:188 to about 1:31.

3. The food composition of claim 2, wherein the ratio of the mastic gum to the allulose is about 1:95.

4. The food composition of claim 1, wherein a ratio of the mastic gum to the cocoa product ranges from about 1:74 to about 1:12.

5. The food composition of claim 4, wherein the ratio of the mastic gum to the cocoa product is about 1:37.

6. The food composition of claim 1, wherein the cocoa product includes cocoa butter, cocoa paste and/or cocoa powder.

7. The food composition of claim 1, further comprising one or more natural ingredients comprising polyphenol having a concentration of about 1.0% to about 2.0% by weight.

8. The food composition of claim 7, wherein the one or more natural ingredients include grape seed extract, cranberry extract, elderberry extract, green tea extract, green tea powder, fennel seed extract, fennel seed powder, cardamom seed extract, cardamom seed powder, cinnamon extract, cinnamon powder, desugared beetroot powder, ginger extract, pumpkin seed powder and/or sesame seed powder.

9. The food composition of claim 1, further comprising one or more biominerals having a concentration of about 0.10% to about 0.2% by weight.

10. The food composition of claim 1, further comprising one or more biominerals having a concentration of about 0.1% to about 0.2% by weight, wherein a ratio of the one or more biominerals to the mastic gum ranges from about 1:22 to about 1:2.

11. The food composition of claim 10, wherein the ratio of the one or more biominerals to the mastic gum is about 5:24.

12. The food composition of claim 9, wherein the one or more biominerals includes calcium and/or magnesium.

13. The food composition of claim 1, further comprising sunflower lecithin having a concentration of about 1% by weight.

14. The food composition of claim 1, further comprising acacia gum or powder, guar gum or powder, locust bean gum or powder, and/or mushroom chitosan.

15. A confectionery product made with the food composition of claim 1.

16. A method of making a healthy food composition, the method comprising:
melting crystalline allulose to form a melted allulose;
cooling the melted allulose to about 45° C. to about 70° C.;
adding at least one natural plant resin, wherein the at least one natural plant resin includes mastic gum or powder, to the cooled melted allulose to form a mixture; and
blending a melt of one or more cocoa products with the mixture to form the food composition of claim 1.

17. The method of claim 16, further comprising adding one or more natural ingredients comprising polyphenol to the mixture.

18. The method of claim 16, further comprising adding one or more biominerals to the melt of one or more cocoa products before blending with the mixture.

19. The method of claim 16, further comprising adding sunflower lecithin to the melt of one or more cocoa products before blending with the mixture.

* * * * *